(12) United States Patent
Jeon

(10) Patent No.: US 10,377,056 B2
(45) Date of Patent: Aug. 13, 2019

(54) INGOT SLICING APPARATUS

(71) Applicant: SK SILTRON CO., LTD., Gumi-si Gyeongsangbuk-do (KR)

(72) Inventor: Ji Won Jeon, Gumi-si (KR)

(73) Assignee: SK SILTRON CO., LTD., Gumi-si, Gyeongsangbuk-Do (KR)

( * ) Notice: Subject to any disclaimer, the term of this patent is extended or adjusted under 35 U.S.C. 154(b) by 35 days.

(21) Appl. No.: 15/564,020

(22) PCT Filed: Jan. 6, 2016

(86) PCT No.: PCT/KR2016/000082
§ 371 (c)(1),
(2) Date: Oct. 3, 2017

(87) PCT Pub. No.: WO2016/200003
PCT Pub. Date: Dec. 15, 2016

(65) Prior Publication Data
US 2018/0133927 A1    May 17, 2018

(30) Foreign Application Priority Data

Jun. 8, 2015 (KR) .................. 10-2015-0080622

(51) Int. Cl.
*B28D 5/04* (2006.01)
*B28D 5/00* (2006.01)
*B23D 57/00* (2006.01)

(52) U.S. Cl.
CPC .......... *B28D 5/045* (2013.01); *B23D 57/003* (2013.01); *B28D 5/00* (2013.01); *B28D 5/0076* (2013.01)

(58) Field of Classification Search
CPC .................................. B28D 5/04; B28D 1/08

USPC .................. 125/16.02, 21; 451/168, 53, 449
See application file for complete search history.

(56) References Cited

U.S. PATENT DOCUMENTS 6,652,356 B1 *  11/2003  Ariga .................. B28D 5/0064
                                                                125/16.02
2014/0144421 A1     5/2014  Chua

FOREIGN PATENT DOCUMENTS

| CN | 102069532 | 11/2011 |
|---|---|---|
| CN | 203171873 U | 9/2013 |
| JP | H10-296719 | 11/1998 |
| JP | H11-216656 | 8/1999 |
| JP | 2002-273648 | 9/2002 |
| JP | 2005-169605 | 6/2005 |
| JP | 2007-320011 | 12/2007 |
| KR | 10-2014-0088714 | 7/2014 |

(Continued)

OTHER PUBLICATIONS

Chinese Office Action dated Nov. 5, 2018 issued in Application No. 201680033266.3 (with English translation).

(Continued)

*Primary Examiner* — Robert A Rose
(74) *Attorney, Agent, or Firm* — KED & Associates, LLP

(57) ABSTRACT

The present disclosure relates to an ingot slicing apparatus, including an ingot moving apparatus provided to be movable vertically and supply an ingot, a wire rotating apparatus provided to be movable horizontally to slice the ingot, a slurry supply unit provided to supply slurry to the slicing apparatus, and an air supply unit provided to supply air to the slicing apparatus and to adjust a supplying amount of the slurry supplied to the slicing apparatus.

18 Claims, 5 Drawing Sheets

(56) References Cited

FOREIGN PATENT DOCUMENTS

KR    10-2014-0089252    7/2014

OTHER PUBLICATIONS

International Search Report (with English Translation) and Written Opinion dated Apr. 14, 2017 issued in Application No. PCT/KR2016/000082.

* cited by examiner

INGOT SLICING APPARATUS

CROSS-REFERENCE TO RELATED PATENT APPLICATIONS

This application is a U.S. National Stage Application under 35 U.S.C. § 371 of PCT Application No. PCT/KR2016/000082, filed Jan. 6, 2016, which claims priority to Korean Patent Application No. 10-2015-0080622, filed Jun. 8, 2015, whose entire disclosures are hereby incorporated by reference.

TECHNICAL FIELD

The present disclosure relates to an ingot slicing apparatus.

BACKGROUND ART

A silicon wafer used as a material for manufacturing electronic components such as semiconductors or solar cells is manufactured through the steps of slicing a single crystalline silicon ingot to a thin slice in a wafer form, lapping to improve the flatness while polishing the wafer to a desired thickness, etching to remove a damage layer inside the wafer, polishing to improve surface mirroring and flatness, cleaning to remove contaminants on a wafer surface, and the like.

In the slicing described above, the ingot is sliced into thin wafer forms by using a wire and slurry.

Recently, a large size of the wafer has become necessary, and an ingot slicing apparatus for slicing the ingot in accordance with this trend is used.

The ingot slicing apparatus is an apparatus for slicing the ingot using a wire provided to be reciprocated at a high speed.

The wafer is produced by applying an abrasive and slurry to the upper surface of the wire capable of reciprocating at a high speed and slicing the ingot by using friction force between the abrasive attached to the wire and the ingot.

A conventional ingot slicing apparatus will be described with reference to FIG. 1.

The conventional ingot slicing apparatus may include an ingot supply apparatus 20 for accommodating and supplying an ingot I, a slicing apparatus 10 provided to slice the ingot I supplied by the ingot supply apparatus 20, and a slurry supply unit 30 provided to supply the slurry S to the slicing apparatus 10. Here, the ingot supply apparatus 20 may be an ingot moving apparatus, and the slicing apparatus 10 may be a wire rotating apparatus.

The ingot supply apparatus 20 may include an ingot storage unit 21 provided to accommodate the ingot I or to move to the slicing apparatus 10, a gusset plate 23 provided so as to confine the ingot I, and a work plate 22 provided to hold the gusset plate 23. Here, the ingot storage unit 21 may be an ingot moving table, the gusset plate 23 may be a slice pad plate, and the work plate 22 may be an ingot clamp.

The slicing apparatus 10 may include a roller 11 provided to be rotatable and a wire 12 provided to be wound to the roller 11 to be reciprocated.

The ingot supply apparatus 20 described above is provided to be movable vertically so that the ingot I may be sliced by moving the ingot I to the wire 12.

The slurry supply unit 30 is provided to apply the slurry S to the wire 12 as shown in the figure.

The conventional ingot slicing apparatus has a problem that the slurry S coated with the ingot I is scattered and flows into the slicing surface of the ingot I.

As a result, the slurry S flows into the sliced interior of the ingot I, and a bellows motion in which the ingot I vibrates in the direction perpendicular to the moving direction of the wire 12 occurs, and thus the noise due to the vibration and the quality of the slicing of the wafer is deteriorated.

Further, since the wire 12 reciprocates in forward and backward directions when the ingot I is being sliced, a thickness of opposite side surfaces is thinner than a center thickness with respect to the center of the wafer, and thus a space generated due to the difference in the thickness described above causes vibration and deflection of the wire 12, and the quality of the wafer is deteriorated.

Furthermore, when the ingot I is being sliced, the amount of the slurry S applied to the surface of the wire 12 is more than necessary, and thus the thickness of the target wafer is thinned.

DETAILED DESCRIPTION OF INVENTION

Technical Problem

The present disclosure is directed to providing an ingot slicing apparatus that may control an amount of slurry supplied to a wire and prevent a thickness of a wafer from being thinner than necessary.

Further, the present disclosure is directed to providing an ingot slicing apparatus which is provided so that the amount of air supplied to the slurry may be controlled differently depending on a position at which the ingot is sliced.

Furthermore, the present disclosure is directed to providing an ingot slicing apparatus which is provided so that the temperature of air supplied to the slurry may be controlled differently depending on a position at which the ingot is sliced.

In addition, the present disclosure is directed to providing an ingot slicing apparatus which is provided so that the angle between air supplied to the slurry and the wire for slicing the ingot may be changed.

Technical Solution

In order to solve the problems described above, an ingot slicing apparatus according to the present disclosure includes an ingot moving apparatus provided to supply an ingot and to be movable in a first direction, a wire rotating apparatus provided to be movable in a second direction intersecting with the first direction and to slice the ingot, a slurry supply unit provided to supply slurry to the slicing apparatus, and an air supply unit for supplying air to the slicing apparatus.

Further, the air supply unit is provided between the slurry supply unit and the ingot.

Furthermore, at least one or more air supply units are provided.

In addition, the air supply unit includes an air inflow hose for providing a flow path for guiding air from the outside to the inside of the air supply unit, and an air discharge port for discharging the air introduced into the air supply unit in a predetermined direction.

Further, an angle between the air discharged from the air discharge port and the slicing apparatus is 90° or less.

Furthermore, at least one or more air supply units are provided to extend along the air discharge port.

In addition, the ingot slicing apparatus according to the present disclosure further includes an air supply unit control unit for controlling the air supply unit, wherein the air supply unit control unit is provided to vary an air supplying amount per hour discharged from the air supply unit depending on a position of the ingot supply apparatus.

Further, the air supply unit control unit is provided to increase the air supplying amount per hour discharged from the air supply unit as a cross-sectional area where the wire rotating apparatus rubs against the ingot is narrower.

Furthermore, the air supply unit control unit is provided to decrease the air supplying amount per hour discharged from the air supply unit as a cross-sectional area where the wire rotating apparatus rubs against the ingot is wider.

In addition, the ingot slicing apparatus according to the present disclosure includes an air supply unit control unit for controlling the air supply unit, wherein the air supply unit control unit is provided to vary a temperature of air discharged from the air supply unit depending on a position of the ingot supply apparatus.

Further, the air supply unit control unit is provided to increase the temperature of the air discharged from the air supply unit as a cross-sectional area where the wire rotating apparatus rubs against the ingot is narrower.

Furthermore, the air supply unit control unit is provided to reduce the temperature of the air discharged from the air supply unit as a cross-sectional area where the wire rotating apparatus rubs against the ingot is wider.

In addition, the ingot slicing apparatus according to the present disclosure includes an air supply unit control unit for controlling the air supply unit, wherein the air supply unit control unit is provided to vary a direction of air discharged from the air supply unit.

Further, the air supply unit is provided to be pivotable by the air supply unit control unit.

Furthermore, an ingot slicing apparatus includes an ingot moving apparatus provided to supply an ingot and to be movable in a first direction, a wire rotating apparatus provided to be movable in a second direction intersecting with the first direction to slice the ingot, a slurry supply unit provided to supply slurry to the slicing apparatus, and an air supply unit provided to supply air to the slicing apparatus, wherein the air supply unit includes an air inflow hose for providing a flow path for guiding air from the outside to the inside of the air supply unit, and an air discharge port for discharging the air introduced into the air supply unit in a predetermined direction.

In addition, an angle formed between the air discharged from the air discharge port and the slicing apparatus is 90° or less.

Further, at least one or more air supply units are provided to extend along the air discharge port.

Furthermore, the ingot slicing apparatus further includes an air supply unit control unit for controlling the air supply unit, wherein the air supply unit control unit is provided to vary a temperature of air discharged from the air supply unit depending on a position of the ingot moving apparatus.

In addition, the air supply unit is provided to be pivotable by the air supply unit control unit.

Further, the air supply unit control unit is provided to increase an air supplying amount per hour discharged from the air supply unit as a cross-sectional area where the wire rotating apparatus rubs against the ingot is narrower.

Advantageous Effects

According to the present disclosure, an ingot slicing apparatus is provided such that an amount of slurry supplied to a wire may be controlled so as to prevent a thickness of a wafer from being thinner than necessary.

Further, according to the present disclosure, the ingot slicing apparatus is provided such that an amount of air supplied to the slurry may be controlled depending on a position at which the ingot is sliced.

Furthermore, according to the present disclosure, the ingot slicing apparatus is provided such that a temperature of air supplied to the slurry may be controlled depending on a position at which the ingot is sliced.

In addition, according to the present disclosure, the ingot slicing apparatus is provided such that the angle between the air supplied to the slurry and the wire slicing the ingot may be changed.

MODES OF THE INVENTION

Hereinafter, a configuration of the present disclosure will be described in detail with reference to the accompanying drawings.

Figure 2:
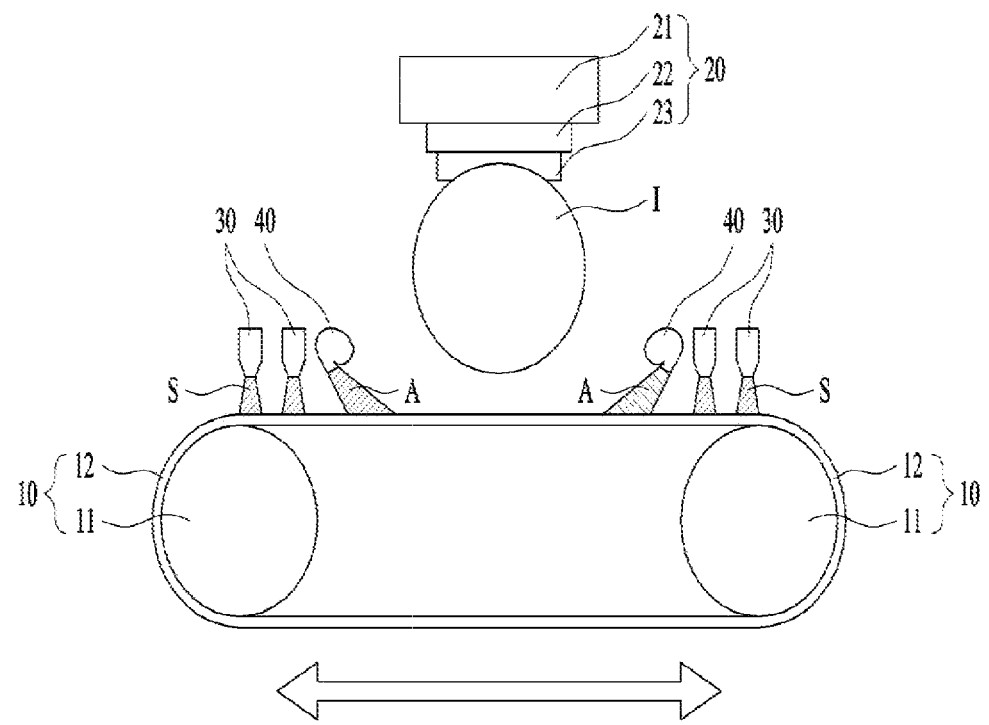
FIG. 2 illustrates an ingot slicing apparatus of the present disclosure.

FIG. 2 illustrates an ingot slicing apparatus of the present disclosure.

Referring to FIG. 2, the ingot slicing apparatus of the present disclosure may include an ingot supply apparatus 20 for accommodating and supplying an ingot I, an slicing apparatus for slicing the ingot I supplied by the ingot supply apparatus 20, a slurry supply unit 30 provided to supply slurry S to the slicing apparatus 10, and an air supply unit 40 provided to adjust an amount of the slurry supplied to the slicing apparatus 10. Here, the ingot supply 20 may be an ingot moving apparatus, and the slicing apparatus 10 may be a wire rotating apparatus. The ingot supply apparatus 20 may include an ingot storage unit 21 provided to accommodate the ingot I or to supply to the slicing apparatus 10, a gusset plate 23 provided so as to confine the ingot I, and a work plate 22 provided to hold the gusset plate 23. Here, the ingot storage unit 21 may be an ingot moving table, the gusset plate 23 may be a slice pad plate, and the work plate 22 may be an ingot clamp.

The slicing apparatus 10 may include a roller 11 provided to be rotatable, and a wire 12 provided to be wound to the roller 11 to be reciprocated in a second direction intersecting a first direction.

The ingot supply apparatus 20 described above is provided to be movable in the first direction so that the ingot I may be sliced by moving the ingot I to the wire 12.

The first direction may be a vertical direction, and the second direction may be a horizontal direction.

The slurry supply unit 30 is provided so as to apply the slurry S to the wire 12 as shown in the figure.

Figure 1:
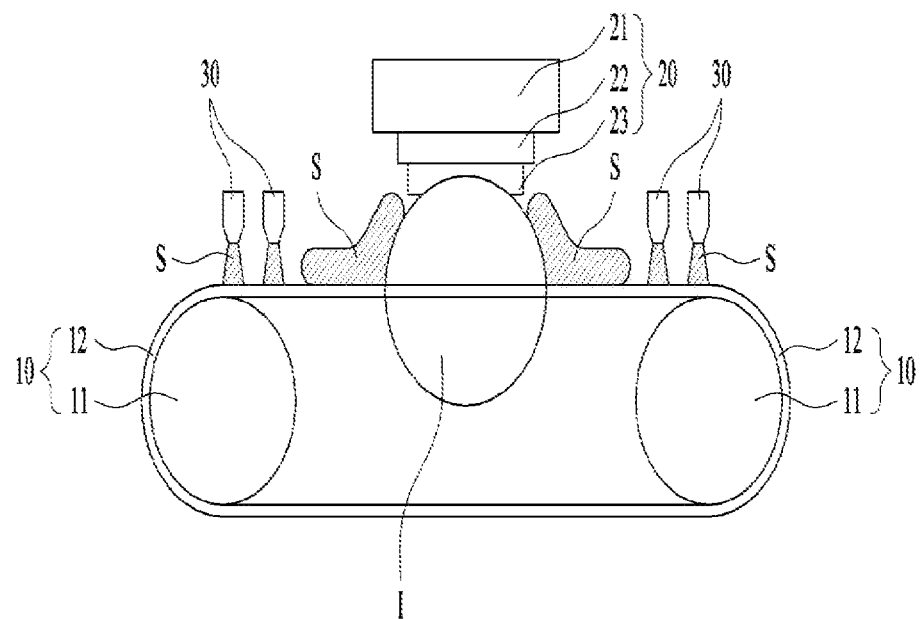
FIG. 1 illustrates a conventional ingot slicing apparatus.

The air supply unit 40 is provided to adjust an amount of the slurry S applied from the slurry supply unit 30 to the wire 12. As shown in FIG. 1, in the case of no existence of the air supply unit 40, as the slicing position of the ingot I is lowered, the slurry permeates to the sliced surface of the ingot I as described above, and the ingot I undergoes bellows motion, thereby causing vibration and wafer quality deterioration. On the other hand, the ingot slicing apparatus according to the present disclosure provides the air supply unit 40, thereby supplying an appropriate amount of slurry to the wire 12.

Further, when an amount of slurry S supplied to the wire 12 is excessively large, the slicing diameter of the wire 12 is increased, thereby causing the thickness of a wafer to be thinner than originally expected. On the other hand, the ingot slicing apparatus of the present disclosure may supply air from the air supply unit 40, and an amount of the slurry S supplied to the wire 12 may be adjusted, thereby preventing the slicing diameter of the wire 12 from increasing more than necessary and improving the quality of the wafer.

Hereinafter, an air blow angle, an air supplying amount per hour, and a temperature of air A supplied by the air supply unit 40 will be described in detail.

Figure 3:
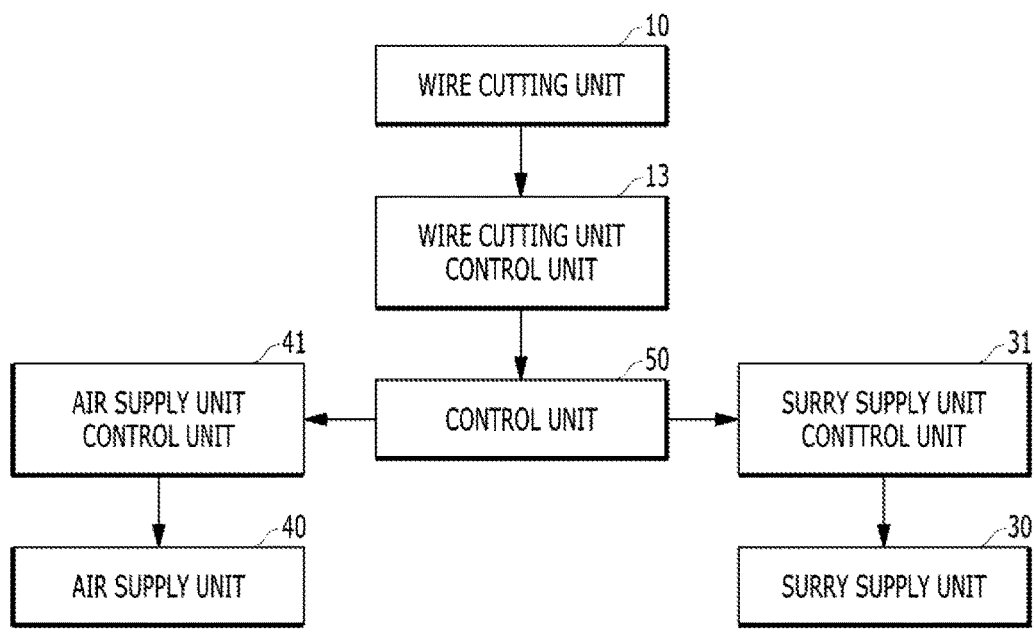
FIG. 3 illustrates a control unit of the ingot slicing apparatus of the present disclosure.

FIG. 3 illustrates a control unit of the ingot slicing apparatus of the present disclosure.

Referring to FIG. 3, the ingot slicing apparatus of the present disclosure may include a control unit 50 for controlling the entire ingot slicing apparatus, an air supply unit control unit 41 provided to control the air supply unit 40, a slurry supply unit control unit 31 provided to control the slurry supply unit 30, a slicing apparatus control unit 13 provided to control the slicing apparatus 10.

More preferably, the control unit 50 may be provided to control the ingot supply apparatus 20 so as to control the slicing position of the ingot I.

The area of the wire 12 that rubs against the ingot I varies depending on the position at which the ingot I is sliced so that the amount of the slurry to be supplied and a temperature of the slurry may be varied.

Accordingly, for better wafer quality, an amount of the slurry to be supplied by the slurry supply unit 30 depending on the slicing position of the ingot I, a temperature of the slurry to be supplied and a supplying amount of air to be supplied by the air supply unit 40 per hour, a temperature of the supplied air, and the like may be controlled to be changed.

The control unit 50 may be provided to control the slicing apparatus control unit 13 that controls the slicing apparatus 10 so as to vary a rotational speed of the roller 11 of the slicing apparatus 10.

The control unit 50 may be provided to control the air supply unit control unit 41 that controls the air supply unit 40 so as to control an amount of air supplied by the air supply unit 40 per hour and a temperature of the supplied air.

Further, the control unit 50 may be provided to control the slurry supply unit control unit 31 that controls the slurry supply unit 30 so as to control an amount of the slurry supplied to the wire 12 and a temperature of the slurry.

That is, the present disclosure primarily controls an amount of the slurry supplied by the slurry supply unit 30 and a temperature of the slurry, and then secondarily controls an amount of the slurry to be finally supplied to the wire 12 by the air supplied by the air supply unit 40, thereby manufacturing a wafer of good quality.

Figure 4A:
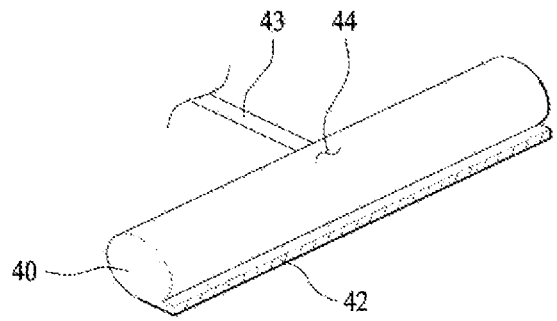
FIGS. 4A, 4B and 4C illustrate air supply units of the ingot slicing apparatus of the present disclosure.
Figure 4B:
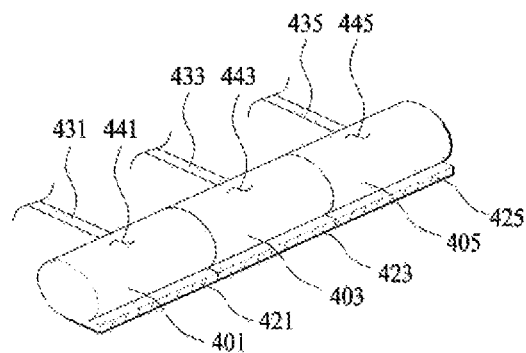
Figure 4C:
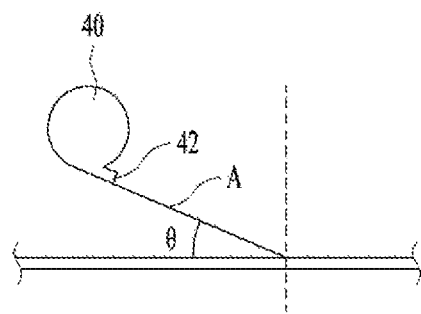

FIGS. 4A, 4B and 4C illustrate the air supply units of the ingot slicing apparatus of the present disclosure.

Referring to FIG. 4A, the air supply unit 40 may include an air inflow hose 43 provided to supply air from the outside to the inside of the air supply unit 40, an air inflow port 44 for providing a space for the air supplied by the air inflow hose 43 to flow into the air supply unit 40, and an air discharge port 42 provided to blow the air, supplied inside of the air supply unit 40, to the wire 12.

The air inflow hose 43 may only need to be provided to introduce air into the air supply unit 40 from the outside and is not limited to the embodiment shown in the drawings.

The air discharge port 42 is illustrated to extend in a direction perpendicular to the direction in which the air is discharged. However, if the air inside the air supply unit 40 can be blown to a certain direction, it may be sufficient. In addition, the shape of the air discharge port 42 is not limited to an embodiment of the present disclosure.

Referring to FIG. 4B, a plurality of air supply units 40 may be provided, and more specifically, a first air supply unit 401, a second air supply unit 403, and a third air supply unit 405 may be provided.

This is so that the air to be blown from the air supply unit 40 may be blown at a higher pressure or an amount of air blowing per hour may be increased.

The number of the air supply units 40 is not limited to an embodiment of the present embodiment, and may be provided differently depending on the needs of users.

The first air supply unit 401 may include a first air inflow hose 431 provided to introduce air from the outside into the first air supply unit 401, a first air inflow port 441 for providing a space for the air supplied by the first air inflow hose 431 to flow into the first air supply unit 401, and a first air discharge port 421 provided to blow the air supplied to the inside of the first air supply unit 401 to the wire 12.

The second air supply unit 403 may include a second air inflow hose 433 provided to introduce air from the outside into the second air supply unit 403, a second air inflow port 443 for providing a space for the air supplied by the second air inflow hose 433 to flow into the second air supply unit 403, and a second air discharge port 423 provided to blow the air supplied to the inside of the second air supply unit 403 to the wire 12.

A third air supply unit 405 may include a third air inflow hose 435 provided to introduce air from the outside into the third air supply unit 405, a third air inflow port 445 for providing a space for the air supplied by the third air inflow hose 435 to flow into the third air supply unit 405, and a third air discharge port 425 provided to blow the air supplied to the inside of the third air supply unit 403 to the wire 12.

FIG. 4C illustrates a blowing angle θ which is the angle between the air A blown by the air supply unit 40 and the wire 12. Hereinafter referring to this, the blowing angle θ of the air supply unit 40 of an embodiment of the present disclosure will be described.

The blowing angle θ of the air supply unit 40 of the embodiment of the present disclosure may be 0° to 90°.

When the blowing angle θ of the air supply unit 40 is 90° or more, that is, when the air is supplied in a direction opposite to the wire 12, slurry S is scattered, and the slurry S adheres to the ingot I, thereby deteriorating the quality of the sliced surface of the ingot I.

In addition, when the blowing angle θ of the air blown from the air supply unit 40 is 90° or more, the function of adjusting a temperature of the ingot I may not be performed.

Accordingly, the blowing angle θ of the air blown from the air supply unit 40 may be provided to be varied, and the blowing angle θ of the air blown from the air supply unit 40 may be 0° to 90°, more preferably 30° to 60°.

As a result, the air supply unit 40 may control the slurry S, and the scattering of the slurry S may be prevented, and thus the quality of the sliced surface of the ingot I may be improved, and the temperature of the ingot I increased due to the slicing may be lowered.

Figure 6A:
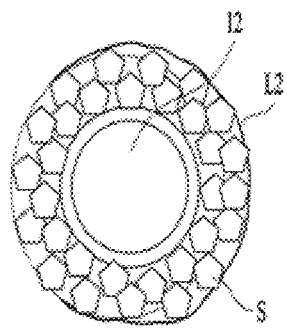
FIG. 6A illustrates a cross-sectional view of a wire in which an air supply unit is not disposed.
Figure 6B:
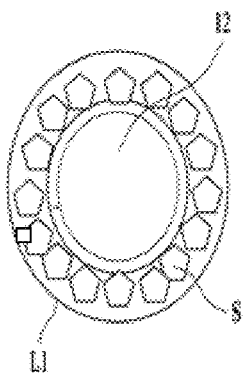
FIG. 6B illustrates a cross-sectional view of the wire according to an embodiment in which an air supply unit is disposed.

Referring to FIGS. 6A and 6B, the effects described above are shown, FIG. 6A is a cross-sectional view of the wire 12 in which the air supply unit 40 is not disposed, and FIG. 6B illustrates the wire 12 of the embodiment of the present disclosure in which the air supply unit 40 is disposed.

As shown in FIG. 6A, the slurry S is unevenly adhered to an outer circumferential surface of the wire 12 where the conventional air supply unit 40 is not disposed.

As described above, the slurry S is attached to the outer circumferential surface of the wire 12 and the wire 12 to which the slurry S is attached is reciprocated to slice the ingot I. In order to ensure the quality of the sliced surface of the ingot I, the sliced surface of the wire 12 should be evenly formed. When the slurry S is unevenly adhered to the outer circumferential surface of the wire 12, a shape like a second sliced surface L2 may be formed.

Accordingly, the quality of the sliced surface of the ingot I may not be assured.

However, it can be seen that the ingot slicing apparatus 10 of the embodiment shown in FIG. 6B includes the air supply unit 40, and the slurry S is evenly adhered to the outer circumferential surface of the wire 12 by the air blown from the air supply unit 40.

As a result, the sliced surface of the wire 12 may be formed in a shape like a first sliced surface L1, and thus the slicing quality of the ingot I may be improved.

The air supply unit control unit 41 may control the angle of the blowing air to be varied depending on the position of the ingot slicing.

The angle at which the air is blown from the air supply unit 40 may be varied in inverse proportion to an area in which the wire 12 and the ingot I contact each other.

Figure 5A:
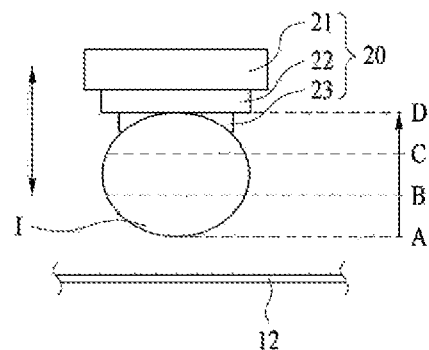
FIGS. 5A, 5B and 5C illustrate an air supplying amount per hour and a supplied air temperature of the air supply unit depending on an ingot slicing position of the ingot slicing apparatus according to the present disclosure.
Figure 5B:
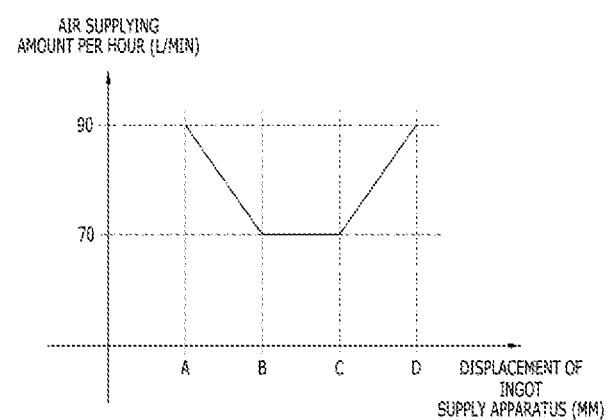
Figure 5C:
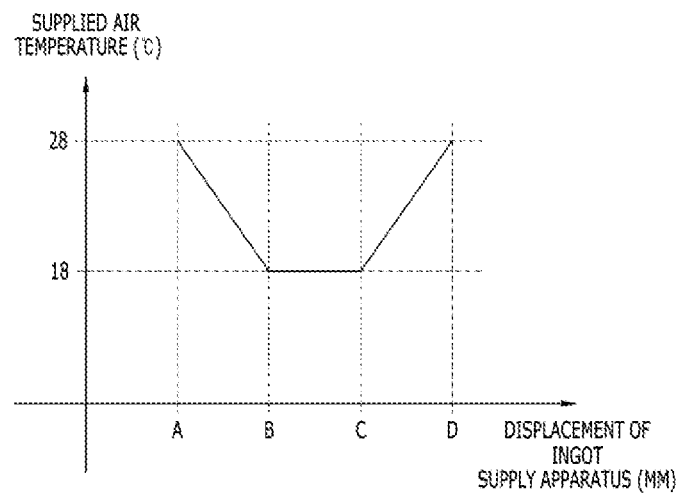

FIGS. 5A, 5B and 5C illustrate an air supplying amount per hour and a supplied air temperature of the air supply unit depending on an ingot slicing position of the ingot slicing apparatus of the present disclosure.

Referring to FIG. 5A to 5C, the ingot I may be movable vertically by the ingot supply apparatus 20, and for the convenience of description, it will be described that the wire 12 to be fixed is positioned at a certain point on the ingot I so as to slice the ingot I.

FIG. 5B illustrates a profile of the air supplying amount L/min per hour supplied by the air supply unit 40 depending on the position of the wire 12 at the ingot I. When the wire 12 is at position A, the cross-sectional area of the ingot I to be sliced by the wire 12 is narrow, and thus the supplying amount of the slurry may be small. Accordingly, when the wire 12 is at the position A, the air supply unit 40 may supply air of 90 (L/min) to the wire 12.

However, when the wire 12 is at position B, the cross-sectional area of the ingot I to be sliced by the wire 12 is wider than that of the ingot I to be sliced by the wire 12 when the wire 12 is at the position A, so that more slurry should be supplied. Thus, the air supply unit 40 may be provided to supply less air of 70 (L/min) to the wire 12 when the wire 12 is at the position B.

However, it may be sufficient that an air supplying amount per hour supplied by the air supply unit 40 may be varied depending on the area of the cross-sectional area of the ingot I to be sliced by the wire 12, and the numerical values are not limited to the above described embodiments.

FIG. 5C illustrates a profile of the supplied air temperature ° C. supplied by the air supply unit 40 depending on the position of the wire 12 at the ingot I. When the wire 12 is at the position A, the cross-sectional area of the ingot I to be sliced by the wire 12 is narrow, so that the generation of heat due to friction is relatively small. Accordingly, when the wire 12 is at the position A, the air supply unit 40 may supply air of 28° C. to the wire 12.

However, when the wire 12 is at the position B, the cross-sectional area of the ingot I to be sliced by the wire 12 is wider than that of the ingot I to be sliced by the wire 12 when the wire 12 is at the position A, so that more heat is generated due to friction. When the wire 12 is at the position B, in order to cool down the heat, the air supply unit 40 may be provided to supply air to the wire 12 at a lower temperature of 18° C.

However, it may be sufficient that the supply temperature of the air supplied by the air supply unit 40 is varied depending on the area of the cross-sectional area of the ingot I to be sliced by the wire 12, and the numerical values are not limited to the above described embodiments.

In the embodiment, the profile of the air supplying amount per hour and the supplied air temperature depending on the displacement of the ingot supply apparatus shown in FIGS. 5B and 5C is illustrated in a straight line so as to help understanding. But it is not limited thereto and may be provided as a curve based on an inflection point as necessary.

The air supplied to the air supply unit 40 may control the supply temperature by a heater (not shown) provided on the air inflow hose 43.

Further, the heater may be controlled via the control unit.

That is, the supply temperature of the air supplied by the air supply unit 40 of the embodiment may be controlled, and thus the temperature of air supplied to the wire 12 by the air supply unit 40 may be varied.

The foregoing detailed description illustrates the present invention. In addition, the foregoing is intended to illustrate and describe the preferred embodiments of the invention and the invention may be utilized in various other combinations, modifications and environments. That is, it is possible to make changes or modifications within the scope of the concept of the invention disclosed herein, within the scope of equivalents to the above described disclosure, and/or within the skill and knowledge of the art. The above described embodiments are intended to describe the best mode for carrying out the technical spirit of the present invention and various modifications required in the specific applications and uses of the present invention are possible. Accordingly, the foregoing detailed description is not intended to limit the invention to the embodiments disclosed. Also, the appended claims should be understood to include other embodiments.

INDUSTRIAL APPLICABILITY

The present disclosure may be used in an ingot slicing apparatus that controls an amount of slurry supplied to a wire so as to prevent a thickness of a wafer from being thinner than necessary.

The invention claimed is:
1. An ingot slicing apparatus comprising:
an ingot moving apparatus provided to supply an ingot and to be movable in a first direction;

a wire rotating apparatus provided to be movable in a second direction intersecting with the first direction and to slice the ingot;

a slurry supply unit provided to supply slurry to the slicing apparatus;

an air supply unit provided to supply air to the slicing apparatus; and an air supply unit control unit provided to control the air supply unit, wherein the air supply unit control unit is provided to vary a temperature of air discharged from the air supply unit depending on a position of the ingot supply apparatus.

2. The ingot slicing apparatus of claim 1, wherein the air supply unit is provided between the slurry supply unit and the ingot.

3. The ingot slicing apparatus of claim 2, wherein at least one or more air supply units are provided.

4. The ingot slicing apparatus of claim 1, wherein the air supply unit comprises:

an air inflow hose for providing a flow path for guiding air from an outside into an inside of the air supply unit; and an air discharge port for discharging the air introduced into the air supply unit in a predetermined direction.

5. The ingot slicing apparatus of claim 4, wherein an angle between the air discharged from the air discharge port and the slicing apparatus is 90° or less.

6. The ingot slicing apparatus of claim 4, wherein at least one or more air supply units are provided so as to extend along the air discharge port.

7. The ingot slicing apparatus of claim 1, wherein the air supply unit control unit is further provided to vary an air supplying amount per hour discharged from the air supply unit depending on a position of the ingot supply apparatus.

8. The ingot slicing apparatus of claim 7, wherein the air supply unit control unit is provided to increase the air supplying amount per hour discharged from the air supply unit as a cross-sectional area where the wire rotating apparatus rubs against the ingot is narrower.

9. The ingot slicing apparatus of claim 7, wherein the air supply unit control unit is provided to decrease the air supplying amount per hour discharged from the air supply unit as a cross-sectional area where the wire rotating apparatus rubs against the ingot is wider.

10. The ingot slicing apparatus of claim 1, wherein the air supply unit control unit is provided to increase the temperature of the air discharged from the air supply unit as a cross-sectional area where the wire rotating apparatus rubs against the ingot is narrower.

11. The ingot slicing apparatus of claim 1, wherein the air supply unit control unit is provided to decrease the temperature of the air discharged from the air supply unit as a cross-sectional area where the wire rotating apparatus rubs against the ingot is wider.

12. The ingot slicing apparatus of claim 1, wherein the air supply unit control unit is provided to vary a direction of air discharged from the air supply unit.

13. The ingot slicing apparatus of claim 12, wherein the air supply unit is provided to be pivotable by the air supply unit control unit.

14. An ingot slicing apparatus comprising:

an ingot moving apparatus provided to supply an ingot and to be movable in a first direction;

a slicing moving provided to be movable in a second direction intersecting with the first direction and to slice the ingot;

a slurry supply unit provided to supply slurry to the slicing apparatus;

an air supply unit provided to supply air to the slicing apparatus; and an air supply unit control unit provided to control the air supply unit, wherein the air supply unit control unit is provided to vary a temperature of air discharged from the air supply unit depending on a position of the ingot moving apparatus, and wherein the air supply unit includes an air inflow hose for providing a flow path for guiding air from the outside into the inside of the air supply unit, and an air discharge port for discharging the air introduced into the air supply unit in a predetermined direction.

15. The ingot slicing apparatus of claim 14, wherein an angle between the air discharged from the air discharge port and the slicing apparatus is 90° or less.

16. The ingot slicing apparatus of claim 14, wherein at least one or more air supply units are provided so as to extend along the air discharge port.

17. The ingot slicing apparatus of claim 14, wherein the air supply unit is provided to be pivotable by the air supply unit control unit.

18. The ingot slicing apparatus of claim 14, wherein the air supply unit control unit is provided to increase an air supplying amount per hour discharged from the air supply unit as a cross-sectional area where the wire rotating apparatus rubs against the ingot is narrower.

* * * * *